United States Patent Office 3,288,205
Patented Nov. 29, 1966

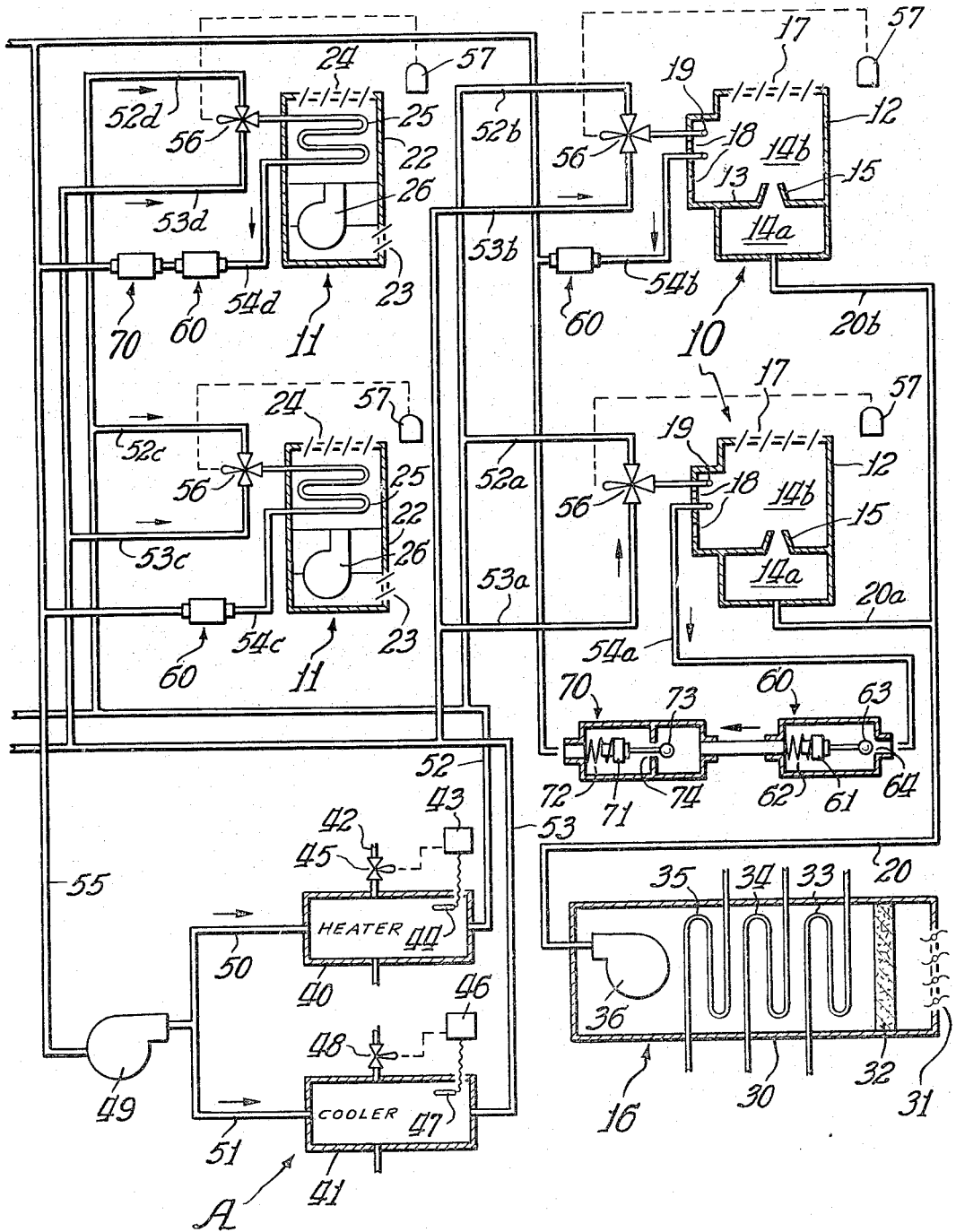

3,288,205
THREE-PIPE AIR CONDITIONING SYSTEM AND CONTROL ARRANGEMENT THEREFOR
Charles W. Egbert, Ridgewood, N.J., assignor to Borg-Warner Corporation, a corporation of Illinois
Filed Nov. 2, 1964, Ser. No. 407,966
7 Claims. (Cl. 165—22)

This invention relates to air-conditioning systems and more particularly to multi-room heating and cooling installations commonly referred to as three-pipe systems.

The conventional three-pipe system, such as described in U.S. Patent No. 3,176,116, issued to C. W. Egbert on January 26, 1965, comprises a plurality of individual heat exchange units located in various rooms within a building, individual circuits to supply heated and chilled water to the heat exchangers, and a common return line leading from each of the heat exchange units to conduct the heat exchange medium to a heater and a liquid chiller. The room heat exchange units, usually either the induction type or the fan coil type, are individually controlled so that the occupant of the particular area in which the unit is located can control the temperature to suit his own personal comfort requirements. The heated and chilled water is supplied through two separate conduit systems from a heater and a water chiller respectively, and after passing through the room units, is mixed and returned through a single return conduit system to the heater or water chiller.

One of the major advantages of the three-pipe system is that it has the ability to operate so that as the air-conditioning load in the room decreases, the quantity of water circulated is also automatically decreased, thereby resulting in low flow rates and a greater temperature range of the water flowing through the coil. By maintaining a reasonably constant entering temperature of both hot and cold water, the temperature of the water leaving the room unit tends to approach room temperature and mixing losses are minimized. At low flow rates, the water leaving the coil is reduced in quantity, and if its temperature is approaching room temperature, then the remaining heating or cooling potential of the water discharged to the common return line is minimized.

The aforementioned statement of the operation presupposes that each room unit always maintains continuous air flow across the heat exchange coil. As a practical matter, however, it is quite common to find fans turned off at the fan-coil units, even though elaborate provisions have been made to prevent this from occurring; and on induction systems, the primary air is sometimes shut off, which of course discontinues the flow of secondary air across the heat exchange coil. It is also not unusual to find lint screens or filters so choked with air-borne dust and lint that the air flow across the secondary coil is virtually stopped.

With no air flow across the heat exchange coil, it is possible to have a condition of full water flow with little or no heat exchange taking place in the coil. As a result, full flow of either hot or cold water can pass through the heat exchange coil into the common return line and mix with water having a greatly different temperature. When this occurs, operating costs rise, reducing the advantages of the three-pipe system. Of particular importance is the uncontrolled flow of hot water through the heat exchanger into the common return line. The temperature difference between the hot water supplied and room temperature is generally greater than the difference between the cold water supplied and room temperature. Moreover, when there is uncontrolled flow of hot water into the common return line (thereby raising the temperature of the return water), the system loses its ability to provide "free cooling" when the outside air temperature is relatively low, but cooling is required in certain areas to take care of the sun load.

While attempts have been made in the past to provide some method of controlling the mixing losses described above, no system has been entirely satisfactory. For example, in U.S. Patent No. 3,198,245, issued to S. P. Soling on August 3, 1965, there is described an arrangement using a temperature override on the three-way inlet valve. However, in addition to being more expensive than the arrangement described herein, such systems are more complicated, often requiring experienced personnel to install and service them.

It is, therefore, a principal object of the present invention to restrict flow through the individual heat exchange coils to a quantity that results in a reasonable temperature range, thereby preventing uncontrolled flow into the common return line.

It is another object of the invention to provide a simple, self-contained temperature actuated flow control device in combination with a three-pipe system.

Additional objects and advantages will become apparent from a reading of the following detailed description taken in conjunction with the drawings wherein:

The figure is a schematic or diagrammatic representation of an air-conditioning system embodying the principles of the present invention.

Referring now to the figure, reference numerals 10 and 11 designate two types of individual room units commonly referred to as induction units and fan coil units respectively. It should be understood that the representation of two types is for the purpose of illustrating that various types of conventional heat exchange units may be employed in this type of system. Induction units 10 each comprise hollow casing 12 having a partition 13 defining a plenum 14a and a mixing zone 14b. The partition is formed to provide one or more air discharge nozzles 15 in the central portion thereof to direct primary air supplied from the primary air conditioning unit 16 upwardly through the casing and out into the room through openings 17. Casing 12 is also provided with additional openings 18 on one side thereof and a heat exchange coil adjacent thereto designated at 19. As the primary air is supplied through conduits 20, 20a, and 20b to the plenums 14a, the room air is drawn in through openings 18 causing it pass over the heat exchange coil 19. The room air is then mixed with the primary air in chamber 14b, and flows out into the room through main outlets 17.

With reference to fan coil units 11, each said unit includes a hollow casing 22 having an air inlet 23, an air outlet 24, a heat exchanger 25 and a fan unit 26. Room air is drawn into the casing through openings 23 into the inlet of the fan unit and directed upwardly across the heat exchange coil 25 through the openings 24 into the room.

The unit for supplying primary air to the induction units, designated at 16, comprises a casing 30 having a louver-controlled inlet 31, a filter 32, a preheat coil 33, a dehumidification coil 34, and a blower 36. Outside air is drawn in controlled quantities through the inlet 31 through the filter and across the preheat coil 33, and the dehumidification coil 34. The air is then circulated by means of blower 36 into the supply ducts 20, 20a, and 20b to the induction units 10.

The heat exchange medium which, except for the most unusual applications, would be water, is circulated from a central station designated at A having a heater 40 and a water chiller or cooler 41. With regard to the heater, steam or other heat exchange medium is supplied through conduit 42 to the heater to heat the water being recirculated from the room units as it passes therethrough. The temperature of the water leaving the heater is thermostatically controlled by means of a unit 43 having a temperature responsive means 44, said unit adapted to control a valve 45 admitting the steam to the heater. Similarly, with regard to the chiller or cooler 41, thermostatic means 46 includes a temperature sensing device 47 and means to actuate a valve 48 which is supplying a refrigerant or other coolant to the chiller. Water pump 49 circulates water through the heater and cooler through lines 50, 51 respectively and is passed to the individual units through lines 52, 53. Hot water supply lines for each unit are designated at 52a, 52b, 52c, and 52d. Similarly, the cold water supply is designated at 53a, 53b, 53c, and 53d. The common return line from each heat exchanger is designated at 54a, 54b, 54c, and 54d, said lines leading into a main riser 55 which is connected to the inlet of water pump 49. Both hot and cold water are supplied to the three-way valves 56 controlled by thermostats 57.

As pointed out in the preliminary remarks, it is an important aspect of the present invention to provide a control device for preventing flow of liquid at a higher or lower temperature than that desired to minimize the mixing losses occurring in the return line. Means for this purpose, including a temperature responsive valve, are connected on the downstream side of the heat exchange units. It should be pointed out that there is disclosed herein a valve system for preventing both excessively hot *and* cold water from being introduced into the return line but either of these may be used independently of the other or may be combined to provide a composite system. As shown in the drawing, some of the units include one such valve while others include both. The valves are shown schematically as associated with one of the induction units on the lower right-hand portion of the figure.

The valve designated at 60 is one which includes a thermostatic element 61 supported by means of a spring member 62 to position a ball valve element 63 against a seat 64 formed within the casing enclosing the valve elements. Valve 60 is one in which the thermostatic element is set to close upon heating so that it will not pass excessively hot water into the return line. This valve will pass full flow of cold water but will start to throttle when the water temperature reaches approximately 110° F. and will be tightly closed at a temperature of approximately 120° F. Valve means 70 is similarly constructed and includes a thermostatic element 71 supported by means of a spring 72 and adapted to actuate a ball valve element 73 against seat 74. Valve 70 is adapted to control the flow of cold water and will be wide open at temperatures of approximately 60° or higher and will materially throttle flow at temperatures of approximately 50° or lower. When used in combination, the range of temperatures of the water permitted to pass into the return line is between approximately 50° and 120° with throttling between 50° and 60° and between 110° and 120°. Since the mixing losses from an economical point of view are much more harmful when hot water is passed, the hot water valve may be used alone as indicated in several of the units. With regard to the cold water valves 70, it is desirable to provide some means to prevent the valve from completely shutting off the flow of water through the heat exchanger in order to avoid freeze-up problems. Such means may take the form of a small passage around the valve element or a limit-stop to prevent the valve element from completely seating itself. It will be appreciated, however, that there are many other ways of accomplishing this result.

From the foregoing statement of the present invention, it should be clear that there has been provided an improved control system which will maintain operating economy and all the advantages of the three-pipe system without a complex control arrangement for insuring against mixing losses. While this invention has been described in connection with a certain specific embodiment thereof, it is to be understood that this is by way of illustration and not by way of limitation; and the scope of this invention is defined solely by the appended claims which should be construed as broadly as the prior art will permit.

What is claimed is:

1. An air conditioning system comprising a plurality of heat exchange coils; means for flowing room air over said coils in heat exchange relation therewith; a chilled liquid circuit including a cooler for supplying a chilled heat exchange fluid to said coils; a heated liquid circuit including a heater for supplying a heated heat exchange fluid to said coils; valve means receiving said heated and said chilled heat exchange fluids, said valve means being selectively operable for flowing either chilled or heated heat exchange fluid through said heat exchange coils; a return system including conduits which form a part of both said chilled liquid circuit and said heated liquid circuit for returning both heated and chilled liquid from said coils to said heater and cooler, said return system further including branch conduits which feed said heater and said cooler, respectively, from a conduit which is common to both said chilled liquid circuit and said heated liquid circuit; and temperature responsive valve means downstream from each heat exchange coil for substantially preventing the flow of fluid from said heat exchange coils to said heater and cooler when the temperature of said fluid rises, by some predetermined amount, above the normal temperature of fluid leaving said heat exchange coils and when the temperature of said fluid falls, by some predetermined amount, below the normal operating temperature of fluid leaving said heat exchange coils.

2. An air conditioning system as defined in claim 1 wherein said temperature responsive valve means comprises a valve adapted to close upon a rise in the temperature of said heat exchange fluid to prevent excessively hot fluid from flowing into said common return lines.

3. An air conditioning system as defined in claim 2 wherein said valve means is fully open when the temperature of said fluid is approximately 110° F. or lower and fully closed at a temperature of approximately 120° F. or higher.

4. An air conditioning system as defined in claim 1 wherein said temperature responsive valve means comprises a valve adapted to close upon a decrease in the temperature of said heat exchange fluid to prevent excessively cold fluid from flowing into said common return lines.

5. An air conditioning system as defined in claim 4 wherein said valve means is in a fully opened position when the fluid temperature is approximately 60° F. or higher and is substantially closed at a fluid temperature of approximately 50° F. or lower.

6. An air conditioning system as defined in claim 5 including means for permitting a small quantity of fluid to flow through said heat exchange coils even when said valve is substantially closed.

7. An air conditioning system comprising a plurality of heat exchange coils; means for flowing room air over said coils in heat exchange relation therewith; a chilled liquid circuit including a cooler for supplying a chilled heat exchange fluid to said coils; a heated liquid circuit including a heater for supplying a heated heat exchange fluid to said coils; valve means receiving said heated and said chilled heat exchange fluids, said valve means being selectively operable for flowing either chilled or heated heat exchange fluid through said heat exchange coils; a return system including conduits which form a part of both said chilled liquid circuit and said heated liquid circuit for returning both heated and chilled liquid from said coils to said heater and cooler, said return system further including branch conduits which feed said heater and said cooler, respectively, from a conduit which is common to both said chilled liquid circuit and said heated liquid circuit; a first temperature responsive valve means downstream from each heat exchange coil, said first temperature responsive valve means including a valve element adapted to close upon an increase of the temperature of said heat exchange fluid; and a second temperature responsive valve means downstream from said each heat exchange coil, said second temperature responsive valve means including a valve element adapted to close upon a decrease in the temperature of said heat exchange fluid, whereby the temperature of the fluid permitted to pass through both of said valve means is maintained within a predetermined range.

References Cited by the Examiner

UNITED STATES PATENTS

| | | | |
|---|---|---|---|
| 2,212,250 | 8/1940 | Schutt | 165—40 X |
| 2,357,706 | 9/1944 | Toepperwein | 165—40 X |
| 2,474,155 | 6/1949 | Melzer | 165—40 |
| 3,198,245 | 7/1965 | Soling | 165—22 |

ROBERT A. O'LEARY, *Primary Examiner.*

M. A. ANTONAKAS, *Assistant Examiner.*